Nov. 12, 1968  F. J. MARUSAK  3,410,673

DOUBLE ION EXCHANGE METHOD FOR MAKING GLASS ARTICLE

Filed Nov. 16, 1964

INVENTOR.
Francis J. Marusak
BY
Milton Peterson
ATTORNEY

United States Patent Office 3,410,673
Patented Nov. 12, 1968

3,410,673
DOUBLE ION EXCHANGE METHOD FOR MAKING GLASS ARTICLE
Francis J. Marusak, Corning, N.Y., assignor to Corning Glass Works, Corning, N.Y., a corporation of New York
Continuation-in-part of application Ser. No. 341,602, Jan. 31, 1964. This application Nov. 16, 1964, Ser. No. 412,592
1 Claim. (Cl. 65—30)

ABSTRACT OF THE DISCLOSURE

This invention relates to the strengthening of glass articles through the development of a surface compression layer thereon by means of ion exchange. More particularly, this invention is concerned with producing lithium silicate glasses, containing substantial amounts of $Al_2O_3$ and/or $ZrO_2$, exhibiting very high flexural and impact strengths by first exchanging lithium ions in the glass surface with sodium ions and thereafter exchanging lithium and/or sodium ions from the exchanged surface layer with potassium ions.

---

Figure 1:
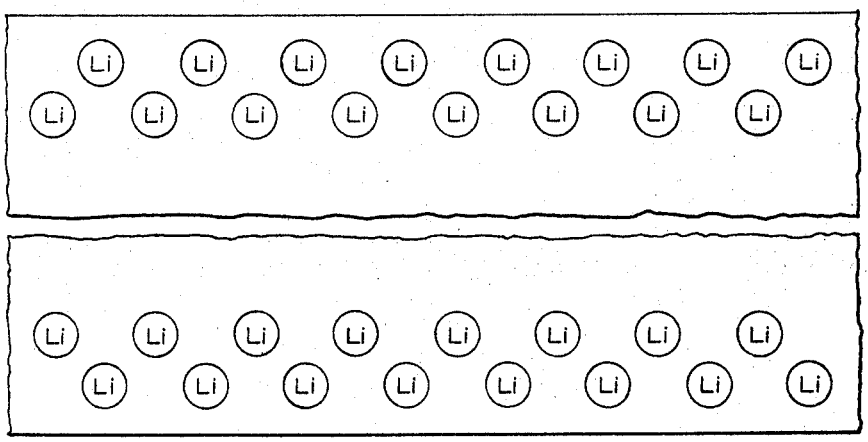

This application is a continuation-in-part of my earlier application, Ser. No. 341,602, filed Jan. 31, 1964, and now abandoned.

The invention has particular utility in the strengthening of surfaced flat glass products, especially surfaced flat glass which has subsurface defects that are only partially removed during polishing of the glass. It is, therefore, illustratively described with reference to this area of special utility and the particular problems incident thereto, although of obviously broader scope.

Flat glass is customarily produced by withdrawing from a furnace reservoir a stream of molten glass which is converted into a continuous sheet or ribbon. The faces of such sheet or ribbon of flat glass normally have a slight waviness or unevenness that is sufficient to cause visual distortion in vehicle or architectural closures. It is customary therefore to surface such glass by grinding the faces to produce parallelism and then polishing to restore transparency.

Traditional surfacing involves passing the continuous sheet of glass, or individual portions bedded in plaster, under an extended series of grinding wheels known as runners. Progressively finer grained abrasive, usually sand, is introduced between the glass and the runners to remove glass by abrasion. The rough ground surfaces are then polished by passing under a series of polishing heads or discs with a much finer abrasive such as rouge.

Flat glass products, such as architectural and vehicle closures, frequently must have their mechanical strength increased to meet service requirements. For example, the American Standard Safety Code requires that glass for automobile side windows pass a drop ball test. In this test, an edge supported, 12" x 12" square of glass is subjected to the impact of a ½ lb. ball dropped from a height of 10 feet onto a face of the glass sheet.

Heretofore, a combination of thermal tempering and a glass sheet thickness of about ¼" has been utilized to pass this test. However, a much greater strengthening potential became available with the recently developed ion exchange strengthening technique wherein ions of large ionic diameter are exchanged for smaller ions within a glass surface layer at temperatures below annealing temperatures to create a compressively stressed layer. This potential was of sufficient magnitude to indicate that the code requirements could be met with flat glass having a thickness under 0.100". The prospect of such a strengthened, flexible, transparent, flat glass product opened up broad new vistas of design and form, particularly in the automotive industry. At the same time, it added the criterion of flexural strength to that of impact strength in evaluating flat glass products.

However, when commercially surfaced flat glass of suitable composition was treated in accordance with known ion exchange strengthening techinques, the indicated strengthening potential of the glass was not realized in terms of impact strength. While studying this anomaly, it was found that extremely small microchecks remained under an apparently clear glass surface after polishing. Further studies demonstrated that the glass could be strengthened to the expected degree providing these microchecks were avoided or eliminated.

This required a grinding technique other than conventional sand grinding, a greatly extended polishing time, or a combination of both. It thus became highly desirable to provide a commercially feasible method of effectively strengthening flat glass produced by a conventional procedure such as sand grinding and ordinary polishing. This was particularly true because of the capital investment in, and production experience with, existing industry facilities for this type of glass surfacing.

My invention is based on discovery of an unusual strengthening effect which meets the need just described, as well as having general utility in glass strengthening regardless of surface conditions. Prior ion exchange practice has involved a single exchange of a larger ion for a smaller, e.g. sodium for lithium. In my new consecutive ion exchange, the illustrative sodium ion exchanged glass is subjected to a further ion exchange with a still larger ion, e.g. the potassium ion. With this further exchange, I find that the normally expected increase in impact strength may be achieved despite the presence of subsurface flaws or defects within the glass. I have further found that a corresponding increase in impact strength is achieved on glassware so processed as to be free of any subsurface flaws.

Based on these findings and discoveries then, my invention resides in a method of producing a strengthened glass article which comprises forming the article from a silicate glass containing at least one exchangeable alkali metal ion of relatively small ionic diameter, introducing into a surface layer on the article and in exchange for a portion of the alkali metal ion therein a first ion of larger ionic diameter than said alkali metal ion whereby compressive stresses are developed within said surface layer, and further introducing into said surface layer in exchange for exchangeable ions therein a second ion which is of larger ionic diameter than said first ion introduced therein whereby the ball impact strength of the article is markedly increased. The invention further resides in the resulting article which is composed of a silicate glass containing at least one relatively small alkali metal ion in its composition and having two substantially parallel zones of glass synthesized inwardly from its surface by ion exchange, the outermost or surface zone having a substantially lesser proportion of the original alkali metal ion than the parent glass and a correspondingly larger proportion of an ion of larger ionic diameter and an ion of intermediate size, and the second zone, inwardly of the first, also containing a substantially lesser proportion of the original alkali metal ion and a correspondingly larger proportion of the replacement ion of a size intermediate the larger ions in the first zone and the ions in the parent glass, the extent of such ion replacement in the glass zones being such that the impact strength of the glass is substantially increased.

The glass employed is preferably a lithium silicate glass containing substantial amounts of alumina or zirconia, for example a glass containing 1–10% lithia ($Li_2O$), at least 5% alumina ($Al_2O_3$) or zirconia ($ZrO_2$) and the balance essentially silica ($SiO_2$). It has previously been shown that such glasses are unusually receptive to low temperature chemical strengthening. Also, lithium, being the smallest of the alkali metal ions, provides the most flexibility in selecting other ions for exchange purposes.

Practice of the invention is now described with reference to the embodiment of special interest, surfaced flat glass of $Li_2O$—$Al_2O_3$—$SiO_2$ composition.

A glass melt of suitable composition is provided and the molten glass rolled or drawn into a continuous ribbon or sheet of flat glass. The opposed faces of the flat glass sheet are then ground, e.g. with a loose sand abrasive, to provide parallelism and thereafter polished. Further description is omitted inasmuch as these operations form no novel or critical part of the invention. Rather, they must be performed in accordance with practices well known in the art and/or described in the literature.

The surfaced glass thus produced is then brought in contact with a source of larger exchangeable ions, preferably by immersion in a molten sodium salt bath. Such salt bath treatment effects a substantial exchange of sodium for lithium ions. This normally creates a compressively stressed layer and a several fold increase in flexural strength, expressed in terms of modulus of rupture, in a glass article of optimum composition. The time sufficient to effect an optimum degree of ion exchange for strengthening may vary from several minutes at a temperature close to the strain point of the glass to several hours at a temperature of 200° C. lower.

In accordance with the novel strengthening technique of this invention, a glass article that has been given a single ion exchange as described above is then subjected to a further ion exchange. In this treatment, a still larger ion is introduced into the glass in exchange for the exchangeable ions then present. For example, the lithium containing glass, initially exposed to sodium ions to produce a sodium ion containing surface layer, may be immersed in a molten potassium salt bath whereby potassium ions are introduced by ion exchange for sodium ions and/or lithium ions.

I have found it desirable to observe certain conditions during this second ion exchange in order to achieve a maxiumum degree of impact strengthening, that is a maximum increase in the resistance of the strengthened article to impact fracture. Specifically, the relatively small ion initially removed from the glass, e.g. the lithium ion in the exemplary glass, appears to have a detrimental influence. It has therefore been found particularly desirable that a final ion exchange in the extreme outer glass surface be effected under conditions such that the amount of contaminating lithium ions present is limited.

With respect to the foregoing considerations, it is desirable that the lithium ion content, calculated as lithium nitrate, in the final potassium ion exchange bath be maintained at a level below 0.2% and preferably on the order of 0.1% or less. This may be accomplished by either continuous purification of the potassium salt bath or by periodic replacement of the salt in the bath with fresh uncontaminated salt. However, either of these practices may prove relatively expensive. I have therefore found it particularly convenient and effective to carry out the potassium ion exchange in two steps employing two separate salt baths.

The intermediate salt bath may either be composed of pure potassium salt or a mixture of potassium salt with a second salt such as a mixture of potassium and sodium nitrates. It is desirable to also minimize the lithium ion concentration in such intermediate bath, although rather higher levels up to 1% or so can be tolerated when the final exchange is in a relatively pure third bath. The time of immersion in the intermediate bath is not critical and may vary from several minutes at temperatures close to the glass strain point to several hours at temperatures on the order of 200° below the strain point.

The glass article is then transferred to the third and final ion exchange bath. This bath is preferably composed of essentially pure potassium nitrate ($KNO_3$) and the glass article is immersed therein for a relatively short period of time, preferably not exceeding about 5 minutes. Thus, the amount of ion exchange and the consequent increase in lithium ion contamination of the salt bath, is relatively small in this final treatment. This in turn reduces the frequency at which the bath must be exchanged and thus minimizes cost.

I do not fully understand why this second ion exchange treatment, i.e. the potassium ion exchange whether effected in one or two steps, has such a marked effect on the impact resistance of a glass article containing subsurface defects from the grinding operation. However, drop ball tests indicate that under optimum conditions, an impact resistance can be obtained approximating that normally obtained on unsurfaced glass with a conventional single sodium for lithium ion exchange treatment. Furthermore, the additional potassium ion treatment, is found to impart a significantly increased ball impact strength, but usually no greater abraded strength, to a defect free sheet of glass having an optimum degree of sodium for lithium ion exchange for abraded strength purposes. It is also observed that, when corresponding treatments are performed on cane samples for flexural strength testing in terms of M.O.R., the potassium ion exchange may increase the unabraded strength while having no significant effect on the abraded strength impart by the initial sodium ion exchange.

These observations suggest that the potassium ion exchange produces a relatively high degree of compression in a very thin surface layer whereas the sodium ions penetrate to greater depth. It also suggests that, once a degree of ion exchange strengthening is achieved in depth, impact strength is more closely related to the degree of surface compression which contributes to unabraded strength. This explanation accords with the fact that a single treatment of a lithium silicate glass in a potassium nitrate bath under the same conditions as the consecutive treatment (i.e. same temperature and total time of treatment) does not produce a degree of strengthening or a distribution of stress approaching that achieved by the present consecutive exchange method.

I have further found that the dual ion exchange may be effected concurrently. Preferably, the parent glass is provided with a combination of two alkali metal ions in its composition for this purpose. Thus, the article to be strengthened may be originally formed from a silicate glass containing both lithium and sodium ions. Such a glass article, after surface, might be immersed in a mixed molten salt bath, for example a bath composed of equal parts by weight of sodium and potassium nitrates.

It is my belief that a concurrent ion exchange occurs. Thus, sodium ions from the bath enter the glass in exchange for lithium ions and, at the same time, sodium ions leave the glass in exchange for potassium ions from the molten salt. It thus appears that the sodium ion, being smaller and more mobile than the potassium ion, penetrates or diffuses more deeply in the glass whether the exchange is concurrent or consecutive.

Figure 2:
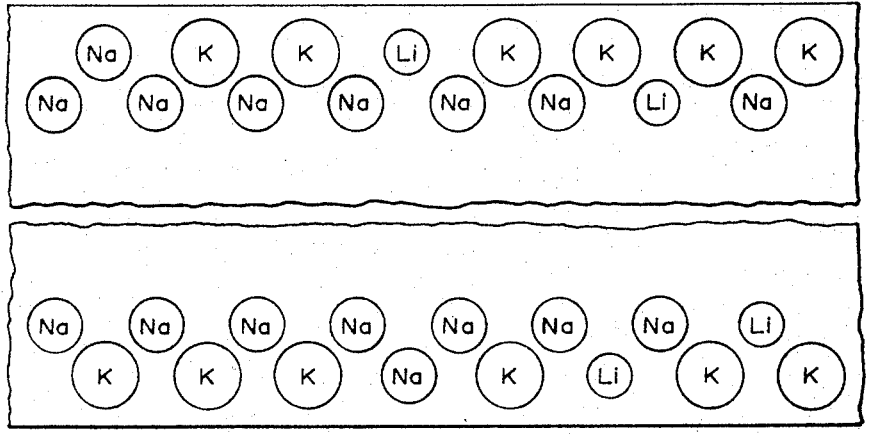

In the accompanying drawing, FIGURES 1 and 2 are fragmented, cross sectional views of a hypothetical glass body before (FIG. 1) and after (FIG. 2) ion exchange in accordance with the present invention. In this drawing, alkali metal ions are symbolically illustrated to demonstrate, in a relative sense, the nature of the exchange and of the resulting article.

In the interest of simplicity, exchange is illustrated in a simple lithium ion glass. This is illustrated in FIG. 1 as a glass containing only lithium ions. Other constituent ions, which are not known to be exchangeable (e.g. oxygen, aluminum and silicon), are omitted.

The larger sodium ions, introduced by ion exchange, tend to form a gradient concentration extending relatively deep into the glass (e.g. two to three hundred microns). Still larger potassium ions are also introduced. These tend to penetrate less deeply and concentrate in a zone adjacent the surface, while the sodium ions predominate deeper in the glass. However, ion exchange at any level or zone in the ion exchanged surface layer on the article is not considered to be either absolute or exclusive as to any one ion. To illustrate this, occasional lithium ions are shown in the exchanged layers. This is not intended to indicate the degree of exchange which is in the nature of an inwardly extending gradient as to both potassium and sodium ions.

The invention will be further described, by way of specific illustration rather than limitation, with respect to the processing of a particular glass and with respect to comparative data which demonstrate the advantages attained.

Example I

A continuous ribbon, four feet in width and about 0.140″ in thickness, was rolled from a glass having a strain point of 566° C., and having the following approximate composition: 62% $SiO_2$, 24% $Al_2O_3$, 3.5% $Li_2O$, 7.5% $Na_2O$, 2.0% MgO, and 1% $Sb_2O_3$. The ribbon was cut into large sections which were set in plaster, and surfaced by passing under a series of conventional revolving grinding wheels. Sand of progressively finer grain size was fed in an aqueous slurry between the glass and the grinding heads in accordance with standard commercial sand grinding practice to remove about 0.025″ of glass and render the sheet "smooth." The characteristic roughened ground surface was then passed under a series of rouge polishing heads to remove about 150 microinches thickness of glass and impart a plane, transparent surface finish to the glass. The process was then repeated on the opposite face to produce parallelism after which the glass was cleaned, dried and cut into square sections approximately 12 inches on a side.

Visual inspection indicated a commercially acceptable surface finish essentially free from surface defects or blemishes. However, a light acid etch, sufficient to remove a few microinches of surface glass, produced a hazy appearance which under magnification appeared as a myriad of small checks in the glass surface. Under further examination these appeared to be fine cracks or microchecks extending into the glass as much as several hundred microinches.

The square sections of surfaced glass (unetched) were then immersed in a molten salt bath consisting of 85% sodium nitrate ($NaNO_3$) and 15% sodium sulfate ($Na_2SO_4$). The glass was treated in this bath for a period of two hours at a temperature of 450° C. It was then removed, cleaned and immersed in a second salt bath, the salt being potassium nitrate ($KNO_3$). Two time-temperature cycles were employed with the potassium bath, and a set of sodium ion exchanged samples was retained without further treatment, to provide comparative data.

After treatment in the $KNO_3$ bath, the individual glass sections were cleaned and mounted so that the sample perimeter was supported in a wooden frame. Each mounted sample was then placed in a horizontal position for drop ball testing in accordance with the earlier referred to code specifications. In this test, a ½ lb. steel ball was dropped onto the center of the glass sample from successive incremental heights of twelve inches until the sample broke or a maximum testing height of 16 feet was reached. The pertinent data is set forth in the following table wherein successive columns show the number of samples in each test group, the temperature in ° C., the time in hours of treatment in the potassium nitrate bath, and the average height in inches at which breakage occurred in the drop ball test.

TABLE 1

| Samples | Temp., ° C. | Time (hours) | Avg. Height (inches) |
|---|---|---|---|
| 6 | (sodium salt bath only) | | 78 |
| 4 | 450 | 1 | 174 |
| 6 | 555 | ¼ | 160 |

Example II

The glass of Example I was melted and rolled into sheets of glass as there described. The sheets were ground by passing under wheels or runners having diamond particles embedded therein as abrasive material, rather than sand ground. The sheets were then polished to restore transparency, but for a time insufficient to completely remove subsurface damage.

Two groups of six 12″ x 12″ square sections each were cut from such polished sheets and treated in a molten salt bath composed of equal parts by weight of potassium and sodium nitrates. One group was exposed to such concurrent ion exchange for two (2) hours at 450° C. while the other was immersed in the bath for three (3) hours at 425° C.

Following these treatments, the groups of glass squares were mounted individually and ball drop impacted to destruction as described in Example 1. For comparison, another group of such square sections was ion exchanged in a sodium nitrate-sodium sulfate (85%–15%) bath at 450° C. for two (2) hours. The average breaking height is shown below for each group:

TABLE 2

| Salt | Temp. (° C.) | Time (hours) | Avg. Height (inches) |
|---|---|---|---|
| (1) $KNO_3$-$NaNO_3$ | 425 | 3 | 160 |
| (2) $KNO_3$-$NaNO_3$ | 450 | 2 | 152 |
| (3) $NaNO_3$-$Na_2SO_4$ | 450 | 2 | 96 |

It is readily apparent then that a double ion exchange in accordance with the present invention provides a distinct improvement in impact resistance of flat glass having a degree of subsurface damage, thereby eliminating the need for complete removal of grinding damage by extended polishing.

Example III

Several sheets of glass were provided as in Example II and divided into sets of six sheets each. All of the glass was given a first ion exchange treatment as in Example I, i.e. immersed in a molten bath of 85% $NaNO_3$–$Na_2SO_4$ for two (2) hours at 450° C. Then each set was immersed in a second bath for two (2) hours at 425° C. The second bath was composed of equal parts by weight of sodium and potassium nitrates but for each set of glass a small controlled amount of lithium nitrate ($LiNO_3$) varying up to 2% of the total salt content was added.

After cooling and cleaning, each glass sheet of each set was drop ball tested as described in Example I. The results follow with the first data column identifying the content of $LiNO_3$ in the treating bath and the second, the average height at which the members of the set broke.

TABLE 3

| $LiNO_3$ (percent) | Avg. Height (inches) |
|---|---|
| 0.0 | 142 |
| 0.5 | 123 |
| 1.0 | 110 |
| 2.0 | 84 |

This quite clearly illustrates the effect of lithium contamination in the final salt bath.

Example IV

The effect of using a short time dip in a relatively pure third bath is illustrated by this example.

Some twelve glass sheets of about 0.080 inch thickness were provided and given a double ion exchange treatment in accordance with Example III. Regular production salt baths having a lithium ion buildup from prior use were employed for all samples, but seven of the sheets were then dipped for five (5) minutes in a fresh KNO₃ bath at 450° C.

When these sheets were drop ball tested as in Example I, the five (5) sheets given the regular treatment broke at heights from seven to ten feet and averaged about eight feet. In comparison, the seven sheets dipped in the pure potassium bath broke at heights of eleven to fifteen feet and averaged about twelve feet. This illustrates the distinct advantage in impact resistance when lithium ion contamination or counter exchange is minimized by a final short treatment in a relatively pure bath.

Example V

The significance of the invention with respect to substantially defect free ware is illustrated in this example.

Eight 6" squares of glass, having a thickness of about 0.080" and the composition of the Example I glass, were sand-ground and polished in the usual manner as described in Example I. These squares were then subjected to an additional one hour polishing treatment which has been found adequate to remove the subsurface defects that normally exist after regular polishing.

Four of these squares were then given a three bath ion exchange treatment as described in the preceeding example. The remaining four repolished squares were given only the initial bath treatment, i.e. immersion in a sodium salt bath for two hours at 450° C. At the same time a set of corresponding squares, which did not have the repolishing treatment, were given each salt bath treatment.

The four sets of squares were then ball impact tested in the manner described earlier for twelve inch squares, but from lesser heights. The average height at which breakage occurred for each set was as follows:

|   | Height (inches) |
|---|---|
| (1) No repolish plus single bath | 21 |
| (2) No repolish plus three bath | 36 |
| (3) Repolish plus single bath | 41 |
| (4) Repolish plus three bath | 77 |

This illustrates that (1) the three bath treatment is approximately as effective as repolishing other factors being equal, and (2) the three bath treatment produces a significant increase in impact strength regardless of the nature of the surface.

Numerous further modifications and variations will readily become apparent from this description. For example, salt baths and glasses other than those specifically disclosed may be employed. Also, corresponding improvement in the impact strength of glass articles other than flat glass, e.g. hollow or tubular containers and vessels, may be obtained by employing the principle of the invention within the scope of the appended claims.

I claim:
1. A method for producing a lithium silicate glass articles, selected from the group consisting of $Li_2O$-$Al_2O_3$-$SiO_2$ and $Li_2O$-$ZrO_2$-$SrO_2$, exhibiting very high flexural and impact strengths which comprises:
   (a) replacing lithium ions in a surface layer of said glass article with sodium ions from an outside source at an elevated temperature below the strain point of the glass whereby compressive stresses are developed within said surface layer; and
   (b) replacing ions selected from the group consisting of lithium ions and sodium ions in said surface layer in a zone thereof adjacent the surface of said glass article with potassium ions from an outside source at an elevated temperature below the strain point of the glass, said source of potassium ions containing less than 0.2% lithium ions, calculated as $LiNO_3$;
   (c) said first and second ion exchanges being conducted concurrently.

References Cited

UNITED STATES PATENTS 3,287,200  11/1966  Hess et al. _____ 65—30

DONALL H. SYLVESTER, *Primary Examiner.*

R. L. LINDSAY, *Assistant Examiner.*